United States Patent [19]

Shyy

[11] Patent Number: 5,262,837
[45] Date of Patent: Nov. 16, 1993

[54] LASER RANGE FINDER

[75] Inventor: Yeu-Hwa Shyy, Hsinchu Hsien, Taiwan

[73] Assignee: Norm Pacific Automation Corp., Taiwan

[21] Appl. No.: 964,257

[22] Filed: Oct. 21, 1992

[51] Int. Cl.[5] .................. G01C 3/08; G01S 13/08; G01S 13/00
[52] U.S. Cl. ........................... 356/5; 342/135; 342/195
[58] Field of Search ............... 342/135, 195; 356/5

[56] References Cited

U.S. PATENT DOCUMENTS

| | | | |
|---|---|---|---|
| 4,453,825 | 6/1984 | Buck et al. | 356/5 |
| 4,498,764 | 2/1985 | Bölkow et al. | 356/5 |
| 4,569,599 | 2/1986 | Bölkow et al. | 356/5 |
| 4,770,526 | 9/1988 | Manhart et al. | |
| 4,947,171 | 8/1990 | Pfeifer et al. | 341/143 |

FOREIGN PATENT DOCUMENTS

| | | |
|---|---|---|
| 0261731A2 | 3/1988 | European Pat. Off. |
| 0357822A1 | 3/1990 | European Pat. Off. |
| 908030 | 10/1962 | United Kingdom |
| 1184955 | 3/1970 | United Kingdom |
| 1201646 | 8/1970 | United Kingdom |

*Primary Examiner*—Stephen C. Buczinski
*Attorney, Agent, or Firm*—Steven M. Rabin

[57] ABSTRACT

A method and an apparatus for measuring the distance to a target according to the time-of-flight of laser pulses. The apparatus includes a transmitter of laser impulses toward the target and a receiver of laser impulses reflected from the target. A driver of the transmitter generates a first time signal corresponding to the transmission. The receiver generates a second time signal corresponding to the reception. A delay generator delays at least one of the first and second signals to compensate for time errors, and provides a third signal corresponding to the first signal and a fourth signal corresponding to the second signal, such that a time difference between the third and fourth signals is exactly equal to the time-of-flight of the transmitted pulses. Additional circuitry delays the earlier of the third and fourth signals so as to provide signals that are delayed by incrementally increasing amounts of time relative to the earlier signal, and matches a time the later signal of the third and fourth signals to one of the incrementally delayed signals, thereby to obtain a time delay value approximating the time-of-flight. In a preferred embodiment, the delay generators are digitally programmable and are controlled by a microprocessor to find the match to the later of the third and fourth signals by using a binary search procedure.

7 Claims, 3 Drawing Sheets

LASER RANGE FINDER

FIELD OF THE INVENTION

This invention relates to a ranging method and apparatus for measuring the distance between the apparatus and a target by employing the laser impulse transit time (time-of-flight) principle. It simplifies the design of the ranging apparatus and executes efficaciously by using digitally programmable delay generators (DPDG) in its processing unit. The resolution of the ranging apparatus can be easily upgraded by serial arrangement of DPDGs.

DESCRIPTION OF THE PRIOR ART

A laser ranging apparatus employs a modulated laser signal for measuring the distance between the ranging apparatus and a target, whereby the transit time of the laser signal from the ranging apparatus to the target and back again is determined. The time difference $\Delta T$, i.e., time-of-flight, between the transmitting of the laser signal and the receipt of the signal reflected by the target, is a direct measure of the distance D to be measured. However, the laser signal is transmitted at the speed of light; therefore, a precise ranging requires a precise time interval measurement. For example, a change in the distance to target by fifteen centimeter corresponds to a change in time difference of only one nanosecond ($10^{-9}$ second).

In the prior art, there are some methods to transform the measured values in order to obtain the required time resolution and calculate the time-of-flight $\Delta T$. These methods, either stretch or lengthen the time interval signal by electronic means, or transform it into another measurable value such as a voltage, rely on a great quantity of precise electronic components, increase the complexity of the circuit. The accuracy of these methods is easily degraded by temperature affects. Methods of calculating the phase difference between the transmitted and received laser signals make the electronic circuit more complicated and take a longer time to perform.

Usually, a laser ranging apparatus uses two detectors, for the transmitted signal, and the reflected signal respectively. It makes the device complicated to be able to process double signals. U.S. Pat. No. 4,770,526 disclosed a better way which used a single detector to sense the transmitted and received laser signals. It simplifies the design of the ranging circuit, but it must use a fiber to guide the feedback laser signal to the optical detector. For this reason, the fiber will shade a part of the cross-sectional area of the transmitted laser beam and thereby decrease the total energy of the transmitted signal. The efficiency of the optical detector will be decreased also. Moreover, since the single optical detector should sense the transmitted and reflected signals timely, the circuit design is still complicated.

Generally, a specific ranging method and apparatus limits the range and resolution obtainable therewith. That means, it is almost impossible to change them by just modifying a part of the circuit. But there is a need to easily satisfy different requirements.

OBJECTS OF THE INVENTION

In view of the foregoing, it is the aim of the invention to provide a method and apparatus for precise ranging which avoids the above mentioned disadvantages of the prior art, more specifically, to provide a method and apparatus for precise ranging, which uses digitally programmable delay generators (DPDGs) to form a simpler ranging circuit than the conventional ranging devices. In other words, this invention uses DPDGs to properly delay the rising edges of signals and provide required signals. As a result, this invention need not transform the measured signals into a required form using a complicated circuit.

Another important feature of the invention is to provide a method and apparatus for precise ranging, which uses electronic circuits with DPDGs to precisely adjust and measure the time-of-flight $\Delta T$, whereby the transmission time of the laser signal is provided by a laser driver directly. A detector detects only the reflected target signal, and a simplified signal processing circuit can be used. Moreover, the processing of digital signals minimizes the affect of temperature.

A further object of this invention is to provide a resolution-adjustable ranging device the resolution of which can be upgraded by a serial arrangement of DPDGs. By such an arrangement, it the invention can increase the accuracy of range determination to satisfy different ranging requirements.

SUMMARY OF THE INVENTION

This invention relates to a method and an apparatus for precisely determining the time-of-flight of a laser beam, and accurately calculating the distance. The apparatus comprises: means for generating a laser signal; means for transmitting and receiving a laser beam; and a time-of-flight processing unit controlled by a microprocessor. A transmitting time signal while transmitting a laser pulse, and a receiving time signal upon receiving the scattered laser beam, are provided to the flight-time processing unit. At least two digitally programmable delay generators comprised in the flight-time processing unit, delay the signals for a proper time interval so that the microprocessor can, by performing a binary search and monitoring the output of a data flip-flop, determine the time-of-flight of the laser beam, so that the distance can then be calculated by multiplying such time by the velocity of light. Also, the velocity of a moving object can be calculated by such a device.

BRIEF DESCRIPTION OF THE DRAWINGS

In order that this invention may be clearly understood, it will now be described, by way of example, with reference to the accompanying drawings, wherein.

DETAILED DESCRIPTION OF PREFERRED EMBODIMENTS

Figure 1:
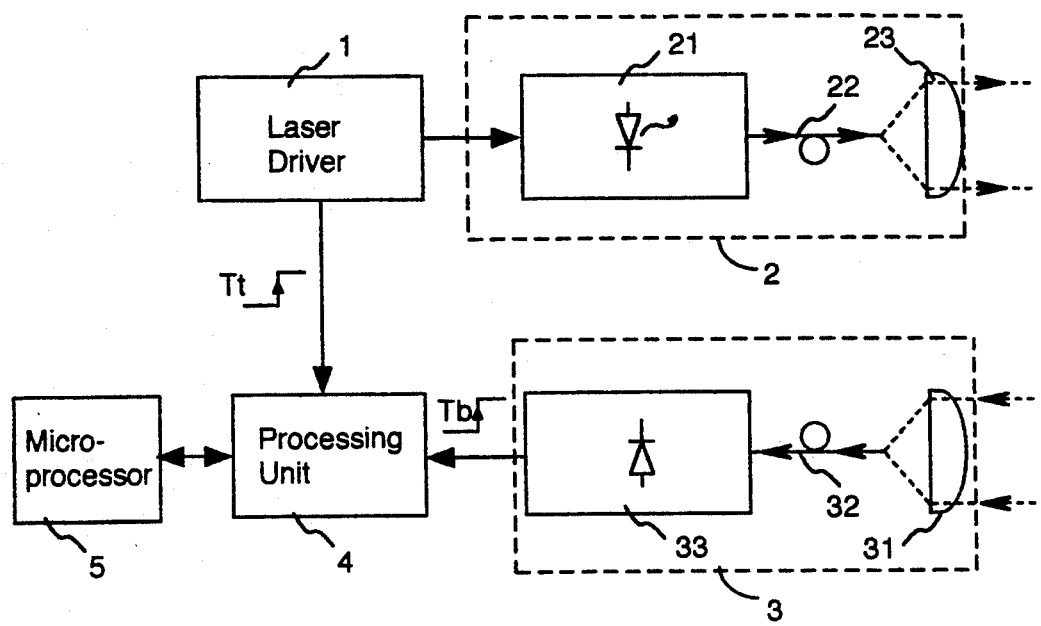
FIG. 1 is a schematic block diagram of a system arrangement according to this invention.

FIG. 1 is a schematic block diagram of a system arrangement according to this invention. A laser driver 1 actuates a transmitter 2 to emit laser pulses, and provides a transmitting time signal Tt to a time-of-flight processing unit 4. The transmitter 2 comprises a laser diode 21 for emitting laser pulses through an optic fiber 22 and lenses 23 to an unshown object. The laser signal scattered back from the object is received by a receiver 3 composed of lenses 31, fiber 32 and a detector 33 whereby a receiving time signal Tb, which relates to the time-of-flight is obtained. The processing unit 4, controlled by a microprocessor 5, suitably adjusts the rising edges of the two signals Tt and Tb in a specific manner (which will be described later) so as to calculate the time-of-flight ΔT and a distance.

Figure 2:
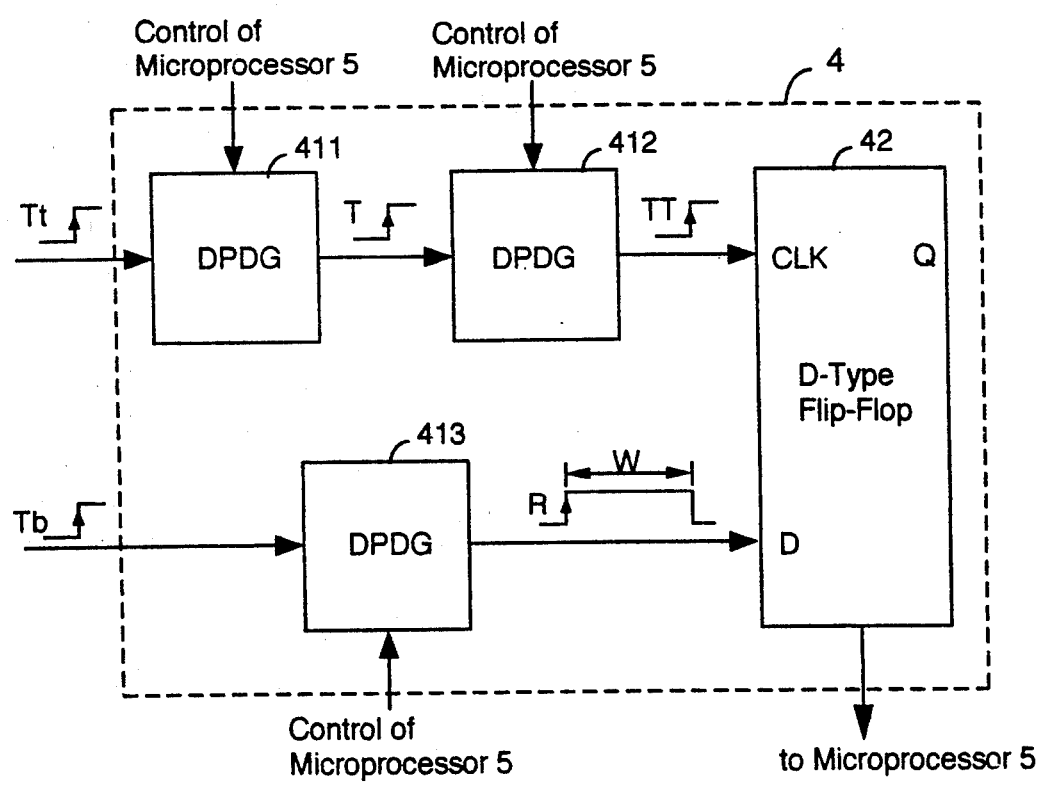
FIG. 2 is a more detailed schematic block diagram of a time-of-flight processing unit in this invention.

FIG. 2 is a more detailed schematic block diagram of a time-of-flight processing unit 4 in an embodiment of this invention. This unit 4 comprises three digitally programmable delay generators (DPDGs) 411, 412, 413 and a D-type flip-flop 42. The transmitting time signal Tt and the receiving time signal Tb are provided to the DPDG 411 and DPDG 413 respectively, and then delayed thereby through control by the microprocessor 5 and output as two delayed signals T and R as shown, which will be further described later with reference to FIG. 3. The delayed signal T is further delayed by the DPDG 412 to provide a series of delayed signals TT which, together with the delayed signal R, are provided to the D-type flip-flop 42. The time-of-flight then ΔT can be checked by a procedure described later with reference to FIG. 4. The pulse width W of the signal R is adjusted to a suitable time interval for the purpose of the procedure, by a delay line incorporated in the DPDG circuit, 413 which is of the prior art. But in the delayed signals T and TT, only the rising edges thereof are concerned.

A DPDG is a known electronic component which contains a linear ramp generator, a D/A converter and a voltage comparator. The rising edge of an input signal triggers the ramp generator. Then the comparator monitors the ramp voltage and switches the delayed output HIGH when the ramp voltage crosses the threshold set by an output voltage of the D/A converter. The threshold voltage is programmable by a digital input from a microprocessor. The slope of the ramp, i.e. the maximum delayable time is adjusted by a resister and a capacitor incorporated in the circuit of the DPDG. This maximum delayable time, called full-scale range (FS) hereinafter, is decided according to a maximum distance that the apparatus will detect. By an n-bit input from a microprocessor, the range FS can be divided into $2^n$ divisions (the corresponding detectable range of distance can also be divided into $2^n$ divisions which relates to the resolution of measurement. For example, if the control input is "11111111" then a delayed signal output is at the end of the FS; and if the control input is "11111000", then a delayed signal output is at the 248th increment in the FS. Thus a DPDG provides a precise incremental delay between input and output, proportional to a digital control input.

The D-type flip-flop 42 utilized in this invention contains a digital input port D, a reference input port CLK and an output port Q. The output of port Q is HIGH if the input (e.g. the delayed signal R) to port D is HIGH while an input (e.g. a delayed signal TT) is triggering at the port CLK; and the output of port Q is LOW if the input to port D is LOW while an input is triggering into at the port CLK.

Figure 3:
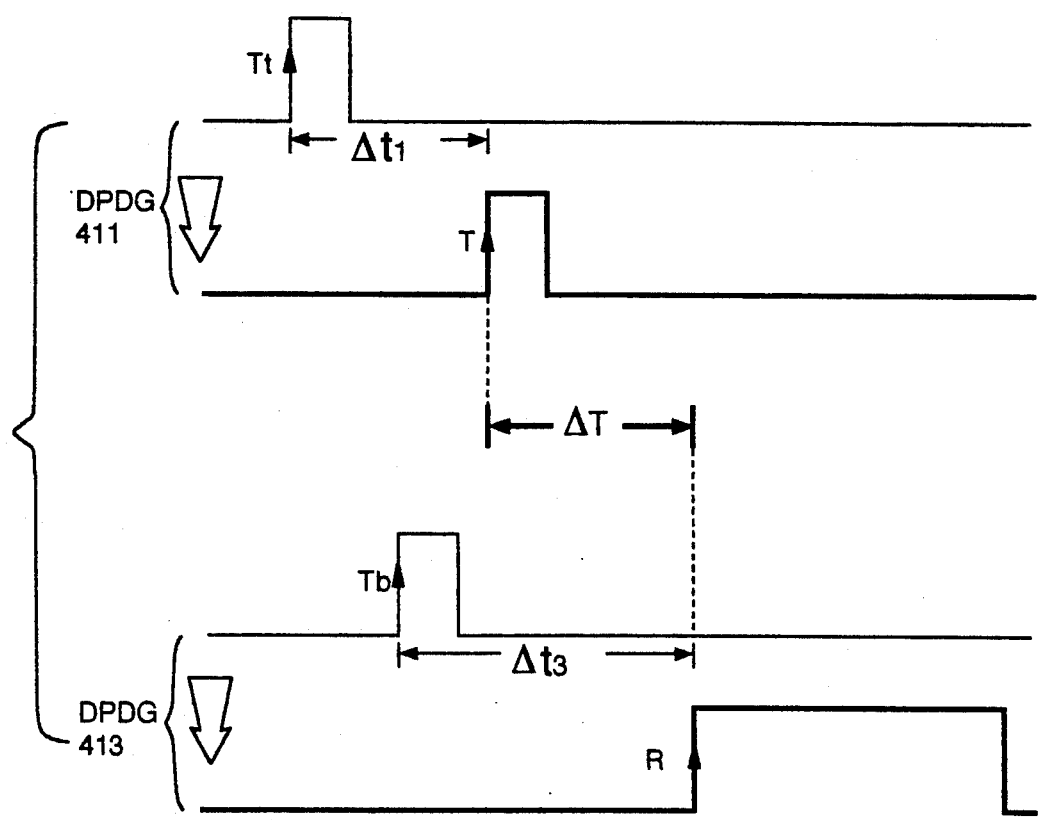
FIG. 3 is a timing diagram illustrating the time signals compensated and adjusted in accordance with this invention.

FIG. 3 is a timing diagram illustrating the condition of time signals compensated and adjusted in an embodiment of this invention. As we know, a ranging apparatus, where there is a response delay in components, needs timing calibration. This embodiment utilizes DPDG 411 and 413 respectively to adjust the rising edges of the input signals Tt and Tb, delays them by suitable respective time intervals Δt1 and Δt3 and outputs respective corresponding delayed signals T and R respectively. The time intervals Δt1 and Δt3 are values taken from ranging a known distance for calibration so that the time difference between signal T and signal R is exactly the time-of-flight ΔT. In other words, all the time error has been compensated by for the DPDGs 411 and 413. Moreover, for a specific range of ranging, the relationship of the delay interval Δt3 to the interval Δt1 can be determined through several ranging tests, and a DPDG, such as the DPDG 411, can be omitted, thereby to further simplify the circuit.

Figure 4:
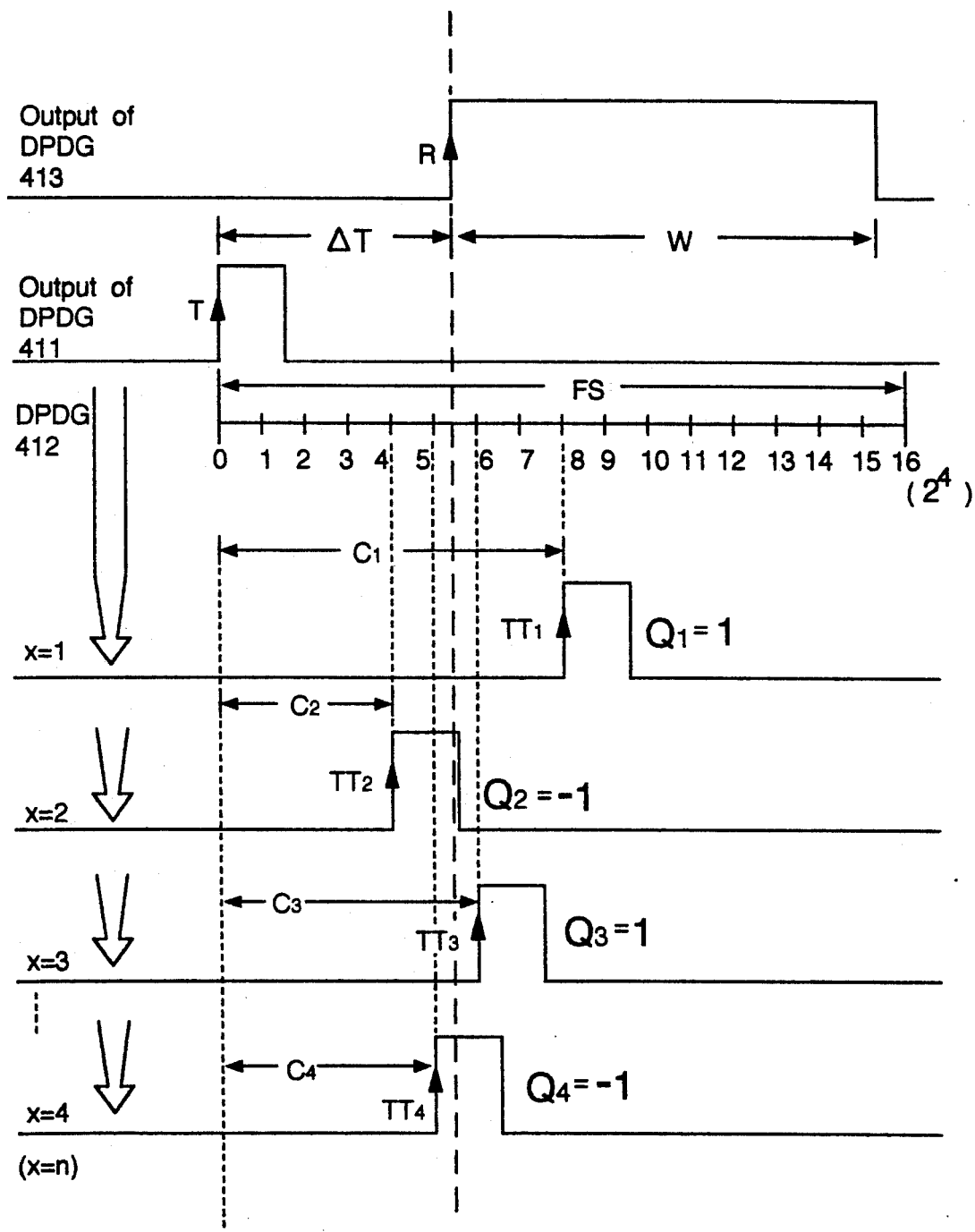
FIG. 4 is a sequential diagram showing an exemplary process of calculating the time-of-flight according to this invention.

FIG. 4 is a sequential diagram showing an exemplary process of calculating the time-of-flight according to this invention. In this embodiment, the delayed output signals R and T of the DPDGs 413 and 411 are adjusted to have a time difference equal to the time-of-flight ΔT. Then, in the proceeding transmitting and receiving, the DPDG 412 tries to delay the signal T with different time intervals C1,C2, ... etc. according to divisions in the full-scale range FS to become signals TT1, TT2, ... . etc. respectively as shown. This is done in a way of "binary search" which will be described later. Through this searching and the function of the D-type flip-flop 42 (FIG. 2) a suitable incremental delay value approximating the time-of-flight ΔT is then obtained.

As shown in FIG. 4, a suitable full-scale range FS, of which is of the maximum delayable time range of the DPDG 412, is set. Accordingly, the width W of the signal R is set to be longer than half of the FS. Suppose that the FS is divided into 16 ($=2^4$) divisions, and the rising edge of the signal R is located between the 5th and 6th increments. Then, through a binary search of n (here equal to 4) times, the microprocessor 5 can provide a result as described below.

The DPDG 412 is first controlled by the microprocessor 5 to delay the signal T to provide a signal TT1 with a time delay C1=FS/2 (i.e. C1=8), then the output of the flip-flop 42 is HIGH (defined here as Q1=1) because the rising edge of the signal TT1 is after that of the signal R. The second time of delay is then set to C2=C1−FS/4 (i.e. C2=4) so that the output of the flip-flop 42 is LOW (defined here as Q2=−1) because the rising edge of the delayed signal TT2 is before that of the signal R. Likewise the third and the fourth time of delay are then set sequentially to C3=C2+FS/8 (i.e. C3=6) and C4=C3−FS/16 (i.e. C4=5), and get Q3=1 and Q4=−1. At this moment the time-of-flight ΔT is ascertained to be within the delay of C3 (6) and C4 (5) and can be represented by 5.5 increments of the FS. Of course, if the segments of the FS is increased by the DPDG 412 to $2^8$ (i.e. n=8), then the resolution or accuracy of the ranging device is also increased, but 8 steps of searching would be required. The aforesaid procedure can be formulated as follows:

$$\Delta T \approx \frac{FS}{2} - \sum_{x=1}^{n} \frac{FS \cdot Q_x}{2^{x+1}}$$

in which
ΔT=time-of-flight
FS=full-scale delayable range of the DPDG 412
n=index of divisions of the FS
$Q_x(x=1,2,\ldots n)$=the time output of the flip-flop 42; defining HIGH as 1, and LOW as −1.

The n-bit digital control value of the microprocessor is dependent to the selection of the DPDGs. A bigger "n" or a smaller range FS will provide better resolution. Therefore, we may serially connect two or even more DPDGs to perform the function of the aforesaid DPDG 412. That is, a former one with lower resolution fast locates a range containing the signal R, then a later one with higher resolution further searches to find the exact position of the signal R in that specific range. Thus several stages of resolution enhancement can be achieved by the serial arrangement of DPDGs, without interfering with the other circuits.

This invention contains a simple circuit and its resolution is easy to design. The ranging unit therein is digitally controlled and gets less interference from temperature. So that it can be used on a vehicle for dynamical ranging to obstacles.

Although this invention has been described with reference to specific embodiments, it is intended to cover all modifications and equivalents within the scope of the appended claims.

What is claimed is:

1. A method of measuring the distance between a target and a ranging apparatus based on time-of-flight of laser impulses, comprising the steps of:
   transmitting laser impulses from the apparatus toward the target and generating a first time signal corresponding to the transmission;
   receiving with the apparatus, laser impulses reflected from the target and generating a second time signal corresponding to the reception;
   delaying at least one of the first and second signals to compensate for time errors so as to provide a third signal corresponding to the first signal and a fourth signal corresponding to the second signal, a time difference between the third and fourth signals being exactly equal to the time-of-flight of the transmitted pulses;
   delaying the earlier of the third and fourth signals so as to provide a plurality of fifth signals, the fifth signals delayed by incrementally increasing amounts of time relative to the earlier of the third and fourth signals; and
   matching the time of the later of the third and fourth signals to the time of one of the fifth signals, to obtain a time delay value approximating the time-of-flight.

2. The method of claim 1, wherein said step of matching includes a binary search.

3. A ranging apparatus for measuring the distance of a target and the apparatus based on the time-of-flight of laser impulses, comprising:
   means for transmitting laser impulses toward the target and generating a first time signal corresponding to the transmission;
   means for receiving laser impulses reflected from the target and generating a second time signal corresponding to the reception;
   delaying means for delaying at least one of the first and second signals to compensate for time errors so as to provide a third signal corresponding to the first signal and a fourth signal corresponding to the second signal, a time difference between the third and fourth signals being exactly equal to the time-of-flight of the transmitted pulses; and
   delaying and matching means for delaying the earlier of the third and fourth signals so as to provide a plurality of fifth signals, the fifth signals delayed by incrementally increasing amounts of time relative to the earlier of the third and fourth signals, and for matching the time of the later of the third and fourth signals to the time of one of the fifth signals, to obtain a time delay value approximating the time-of-flight.

4. The apparatus of claim 3, wherein said first and second delaying means comprise digitally programmable delay generators.

5. The apparatus of claim 3, wherein said delaying and matching means includes at least one digitally programmable delay generator and a microprocessor for controlling said at least one digitally programmable delay generator.

6. The apparatus of claim 3, wherein at least one digitally programmable delay generator comprises at least two serially connected, digitally programmable delay generators.

7. A ranging apparatus for measuring the distance of a target from the apparatus based on the time-of-flight of laser impulses, comprising:
   means for transmitting laser impulses toward the target and generating a first time signal corresponding to the transmission;
   means for receiving laser impulses reflected from the target and generating a second time signal corresponding to the reception;
   a processing unit, including
      first delaying means including at least a first digitally programmable delay generator, for delaying at least one of the first and second signals to compensate for time errors so as to provide a third signal corresponding to the first signal and a fourth signal corresponding to the second signal, a time difference between the third and fourth signals being exactly equal to the time-of-flight of the transmitted pulses,
      second delaying means, including at least a second digitally programmable delay generator, for delaying the earlier of the third and fourth signals so as to provide a plurality of fifth signals, the fifth signals delayed by incrementally increasing amounts of time relative to the earlier of the third and fourth signals, and
   a D-type flip-flop connected to receive in separate ports the fifth signals and the later of the third and fourth signals; and
   a microprocessor, monitoring the output of said D-type flip-flop, and controlling said second digitally programmable delay generator, to perform a binary search so as to match the time of the later of the third and fourth signals to the time of one of the fifth signals, thereby to obtain a time delay value approximating the time-of-flight.

* * * * *